United States Patent
Zhu et al.

(10) Patent No.: US 8,914,379 B2
(45) Date of Patent: Dec. 16, 2014

(54) INDEX CONSTRUCTING METHOD, SEARCH METHOD, DEVICE AND SYSTEM

(75) Inventors: Zhengping Zhu, Guangdong (CN); Chao Ma, Guangdong (CN); Yan Shen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/234,058

(22) PCT Filed: Jun. 12, 2012

(86) PCT No.: PCT/CN2012/076767
§ 371 (c)(1),
(2), (4) Date: Jan. 24, 2014

(87) PCT Pub. No.: WO2013/010414
PCT Pub. Date: Jan. 24, 2013

(65) Prior Publication Data
US 2014/0156671 A1  Jun. 5, 2014

(30) Foreign Application Priority Data
Jul. 21, 2011 (CN) .......................... 2011 1 0204879

(51) Int. Cl.
*G06F 17/30* (2006.01)
(52) U.S. Cl.
CPC .... *G06F 17/30312* (2013.01); *G06F 17/30091* (2013.01); *G06F 17/30094* (2013.01); *G06F 17/30336* (2013.01)
USPC .......................................................... 707/741
(58) Field of Classification Search
CPC ................... G06F 17/30091; G06F 17/30094; G06F 17/30312
USPC .......................................................... 707/741
See application file for complete search history.

(56) References Cited

U.S. PATENT DOCUMENTS 5,852,822 A * 12/1998 Srinivasan et al. ..................... 1/1
6,516,337 B1 * 2/2003 Tripp et al. ................... 709/202
(Continued)

FOREIGN PATENT DOCUMENTS

CN  101136016 A  3/2008
CN  101989301 A  3/2011

OTHER PUBLICATIONS

Blanco, Roi, et al., "Caching Search Engines Results over Incremental Indices", SIGIR '10, Geneva, Switzerland, Jul. 1-23, 2010, pp. 82-89.*

(Continued)

*Primary Examiner* — Robert Stevens
(74) *Attorney, Agent, or Firm* — Marshall, Gerstein & Borun LLP

(57) ABSTRACT

The present disclosure discloses an index constructing method, search method, device and system. The index constructing method includes: constructing data obtained in each preset time period into a primary index segment, respectively, and merging the constructed primary index segments into a primary index segment set after each preset time period is over; copying and merging each primary index segment in the primary index segment set into a corresponding large index segment, to obtain a large index segment set; and sending the primary index segments in the primary index segment set or the large index segments in the large index segment set to a search device to provide a search service. The present disclosure constructs the primary index segments on the basis of time, merges the constructed primary index segments into the large index segment, and provides the search service simultaneously with the primary index segments or the large index segments, thus, improving search speed.

14 Claims, 6 Drawing Sheets

(56) References Cited

U.S. PATENT DOCUMENTS

| | | | |
|---|---|---|---|
| 6,631,373 B1* | 10/2003 | Otani et al. ............................ 1/1 |
| 6,675,205 B2* | 1/2004 | Meadway et al. ............ 709/219 |
| 6,983,322 B1* | 1/2006 | Tripp et al. .................... 709/225 |
| 7,370,035 B2* | 5/2008 | Gross et al. ............................ 1/1 |
| 2008/0071732 A1* | 3/2008 | Koll ................................. 707/2 |
| 2008/0313218 A1* | 12/2008 | Takahashi .................... 707/102 |
| 2009/0193406 A1* | 7/2009 | Williams ....................... 717/168 |
| 2010/0115332 A1* | 5/2010 | Zheng et al. ....................... 714/6 |
| 2011/0270820 A1* | 11/2011 | Agarwal ....................... 707/709 |

OTHER PUBLICATIONS

Wang, Jinbao, et al., "Indexing Multi-dimensional Data in a Cloud System", SIGMOD '10, Indianapolis, IN, Jun. 6-10, 2010, pp. 591-602.*

Büttcher, Stefan, "Multi-User File System Search", Thesis—Doctor of Philosophy in Computer Science, Univ. of Waterloo, Waterloo, Ontario, Canada, © 2007, 232 pages.*

Tomasic, Anthony Slavko, "Distributed Queries and Incremental Updates in Information Retrieval Systems", Thesis—Doctor of Philosophy in Computer Science, Princeton University, Princeton, NJ, Jun. 1994, 157 pages.*

Li, Ning, et al., "Leveraging a Scalable Row Store to Build a Distributed Text Index", CloudDB '09, Hong Kong, China, Nov. 2, 2009, pp. 29-35.*

Bhagwat, Deepavali, et al., "Extreme Binning: Scalable, Parallel Deduplication for Chunk-based File Backup", MASCOTS 2009, London, UK, IEEE, Sep. 21-23, 2009, pp. 1-9.*

International Search Report for PCT/CN2012/076767 dated Oct. 4, 2012.

* cited by examiner

INDEX CONSTRUCTING METHOD, SEARCH METHOD, DEVICE AND SYSTEM

This application claims the benefit of priority from Chinese Patent Application, No. 201110204879.8, entitled "index constructing method, search method, device and system" and filed on Jul. 21, 2011, the entire contents of which are hereby incorporated by reference.

FIELD OF THE DISCLOSURE

The present disclosure relates to search technology, and more particularly to, an index constructing method, search method, device and system.

BACKGROUND

With the popularity of the network and the increasing amount of information, application ranges of search technology are more and more widely. In order to achieve searching, it needs to construct data into indexes in advance and then perform searching according to the indexes constructed in advance. Thus, a manner of constructing indexes can determine search speed.

In the related art, one manner of constructing indexes is to establish two index segments including one large index segment and one small index segment according to file size, merge new data into the small index segment in real time, and merge at some time the large index segment and the small index segment into a new large index segment. During searching, the large index segment and the small index segment are simultaneously searched, and then results of the searching in both of the large index segment and the small index segment are merged.

In the process of implementation of the present disclosure, inventors find that the related art has at least the following disadvantages:

Since in the related art, it is needed to merge the new data and the small index segment and then merge the small index segment and the large index segment before providing search service, thus, the search speed is affected.

SUMMARY

In order to improve search speed, one example of the present disclosure provides an index constructing method, search method, device and system. The technical solution is as follows:

On one hand, an index constructing method is provided, the methods includes:

constructing data obtained in each preset time period into a primary index segment, respectively, and merging the constructed primary index segment into a primary index segment set after each preset time period is over;

copying each primary index segment in the primary index segment set and merging the copied primary index segments into a corresponding large index segment, to obtain a large index segment set; and sending the primary index segments in the primary index segment set or the large index segments in the large index segment set to a search device to provide search service.

An index constructing device is also provided and includes:

a constructing module configured to construct data obtained in each preset time period into a primary index segment, respectively, and merge the constructed primary index segment into a primary index segment set after each preset time period is over;

a first merging module configured to copy each primary index segment in the primary index segment set obtained by the constructing module and merge the copied primary index segments into a corresponding large index segment to obtain a large index segment set; and a sending module configured to send the primary index segments in the primary index segment set obtained by the constructing module or the large index segments in the large index segment set obtained by the first merging module to a search device to provide search service.

On the other hand, a search method is also provided and includes:

every each preset period, obtaining a first-level index segment from an index constructing device, and merging the obtained first-level index segment into a first-level index segment set;

copying each first-level index segment in the first-level index segment set and merging the copied first-level index segments into a corresponding second-level index segment to obtain a second-level index segment set;

providing search service according to the first-level index segments in the first-level index segment set and the second-level index segments in the second-level index segment set.

A search device is also provided and includes:

an obtaining module configured to, every each preset period, obtain a first-level index segment from an index constructing device, and merge the obtained first-level index segment into a first-level index segment set;

a second merging module configured to copy each first-level index segment in the first-level index segment set obtained by the obtaining module, and merge the copied first-level index segments into a corresponding second-level index segment to obtain a second-level index segment set;

a search module configured to provide search service according to the first-level index segments in the first-level index segment set obtained by the obtaining module and the second-level index segments in the second-level index segment set obtained by the second merging module.

On the other hand, a search system is also provided and includes an index constructing device and more than one search devices;

the index constructing device is the above index constructing device;

the search device is the above search device.

Beneficial effects of the technical solution provided in embodiments of the present disclosure include:

As mentioned above, since in the related art, it is needed to merge the new data and the small index segment and then merge the small index segment and the large index segment before providing search service, thus, the search speed is affected; while after adopting the technical solution provided in embodiments of the present disclosure, constructing primary index segments on the basis of time, merging the constructed primary index segments into the large index segment, and provides the search service simultaneously with the primary index segments or the large index segments, i.e., the already constructed primary index segments or large index segments can be used to provide search service at the time of constructing indexes, one thread for constructing indexes and one thread for searching are executed in parallel, thereby improving the search speed.

BRIEF DESCRIPTION OF DRAWINGS

Exemplary examples of present disclosure will be described in detail with reference to the accompanying drawings to make one skilled in the art clearer of the above and other features and advantages of the present disclosure. In drawings.

DETAILED DESCRIPTION

In order to make the objectives, technical solutions and advantages of the present disclosure more clear, various examples of the present disclosure will be described in detail with reference to the accompanying drawings.

First Example

Figure 1:
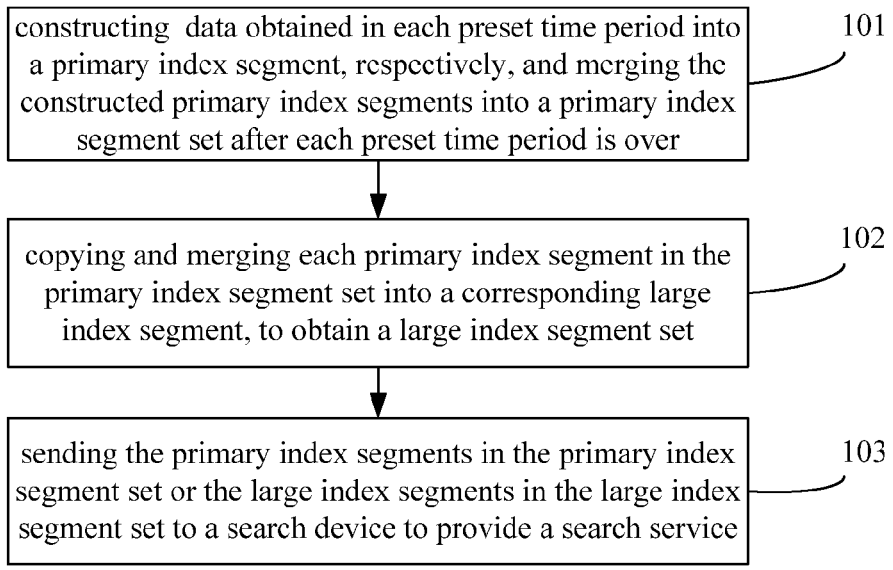
FIG. 1 is a flow chart of an index constructing method according to a first example of the present disclosure.

This example provides an index constructing method. Referring to FIG. 1, a flow of the method provided in this example is specifically as follows:

101: constructing data obtained in each preset time period into a primary index segment, respectively, and merging the constructed primary index segment into a primary index segment set after each preset time period is over;

102: copying each primary index segment in the primary index segment set and merging the copied primary index segments into a corresponding large index segment, to obtain a large index segment set;

103: sending the primary index segments in the primary index segment set or the large index segments in the large index segment set to a search device so as to provide search service.

In order to clearly illustrate the method provided in this example, the method provided in this example will be further explained hereinafter with reference to specific content of a second example. Details refer to the content of the following second example.

Second Example

Figure 2:
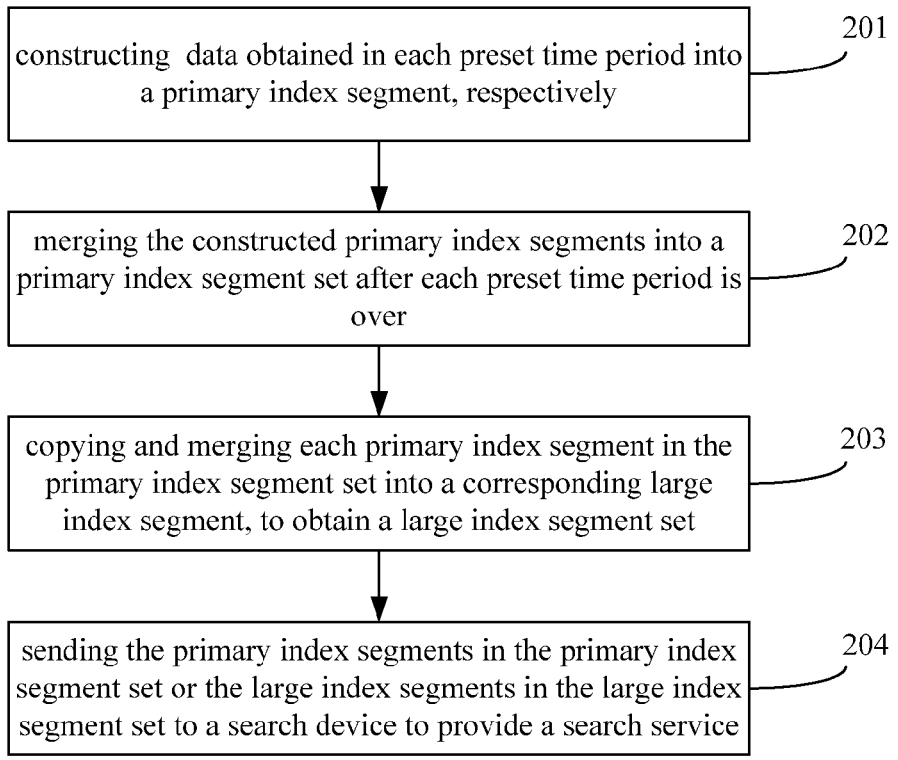
FIG. 2 is a flow chart of an index constructing method according to a second example of the present disclosure.

This example provides an index constructing method. Referring to FIG. 2, a flow of the method provided in this example is specifically as follows:

201: constructing data obtained in each preset time period into a primary index segment, respectively.

For this step, this example does not limit size of the preset time period. For convenience of description, this example only takes the size of the preset time period being 5 minutes as an example, and then the method provided in this example constructs data obtained in every 5 minutes into a primary index segment, respectively. Since constructing data into index segments is already very mature existing technology, thus, the manner of constructing the obtained data into a primary index segment is not specifically described and limited here in this example.

Specifically, the constructed primary index segment contains multiple independent index structures of data, and the independent index structures include but not limited to an inverted index, a delete table, document basic information and customized other information. Each item in an index table of the inverted index includes an attribute value and an address of each record having the attribute value. Not by the records to determine attribute value, but by the attribute value to determine the location of the records, which is called the inverted index. Index objects of the inverted index are words, etc., in a document or a set of documents. The inverted index is used to store storage locations of words in a document or a set of documents, and is a common index mechanism of a document or a set of documents. Each document has its own separate document id, and thus different documents can be able to be distinguished. With respect to the specific content of the document basic information, it is not specifically limited in this example. In this example, in order to use information already existing in the index segments to construct appropriate and fast memory data structure, one way of initializing the constructed primary index segments is taken in this example, and the data structure of the primary index segments after initialization can be shown in following Table 1:

TABLE 1 segment header:
location and length of mapping table from key word to inverted index
location and length of inverted index
location and length of delete table
location and length of mapping table from document id to document basic information
location and length of document basic information
other information
mapping table from key word to inverted index
inverted index
delete table
mapping table from document id to document basic information
document basic information In table 1, whether the mapping table from key word to inverted index or the mapping table from document id to document basic information, each mapping table is composed of a hash array and a collision list, and the hash array and the collision list form a close array structure. During initialization, data can be directly taken as a mapping table.

202: after each preset time period is over, merging the constructed primary index segments into a primary index segment set.

For this step, still taking the preset time period being 5 minutes as an example, then in every 5 minutes, all obtained data can be constructed into a primary index segment; after reaching 5 minutes, the primary index segment is merged into a primary index segment set. The primary index segment set includes primary index segments constructed in a plurality of 5 minutes.

Preferably, since the method provided in this example will merge the primary index segments in the primary index segment set into a corresponding large index segment set, thus, in order to save memory resources, after merging the constructed primary index segments into a primary index segment set, the method provided in this example further includes:

every each preset period, deleting primary index segments which are constructed before the each preset period from the primary index segment set.

This example does not limit specific size of the preset period, so long as it can be ensured that in each preset period, primary index segments to be deleted have been already merged into a large index segment set.

203: copying each primary index segment in the primary index segment set and merging the copied primary index segments into a corresponding large index segment, to obtain a large index segment set.

Figure 3:
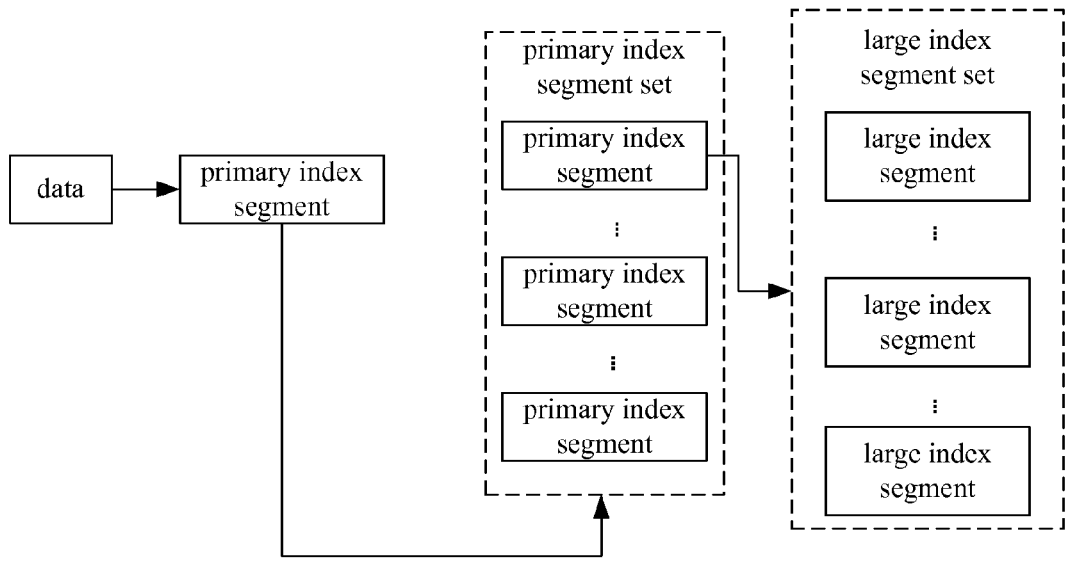
FIG. 3 is a schematic diagram of merging index segments according to the second example of the present disclosure.

Specifically, FIG. 3 shows a whole process of constructing the primary index segment, merging the primary index segment into the primary index segment set, and copying and merging each primary index segment in the primary index segment set into the corresponding large index segment.

When copying each primary index segment in the primary index segment set and merging the copied primary index segments into the corresponding large index segment, each primary index segment in the primary index segment set may be copied in turn according to time sequence, and the copied primary index segments are merged into the corresponding large index segment. The corresponding large index segment is a large index segment which is in the large index segment set and neighbors a free memory.

Figure 4:
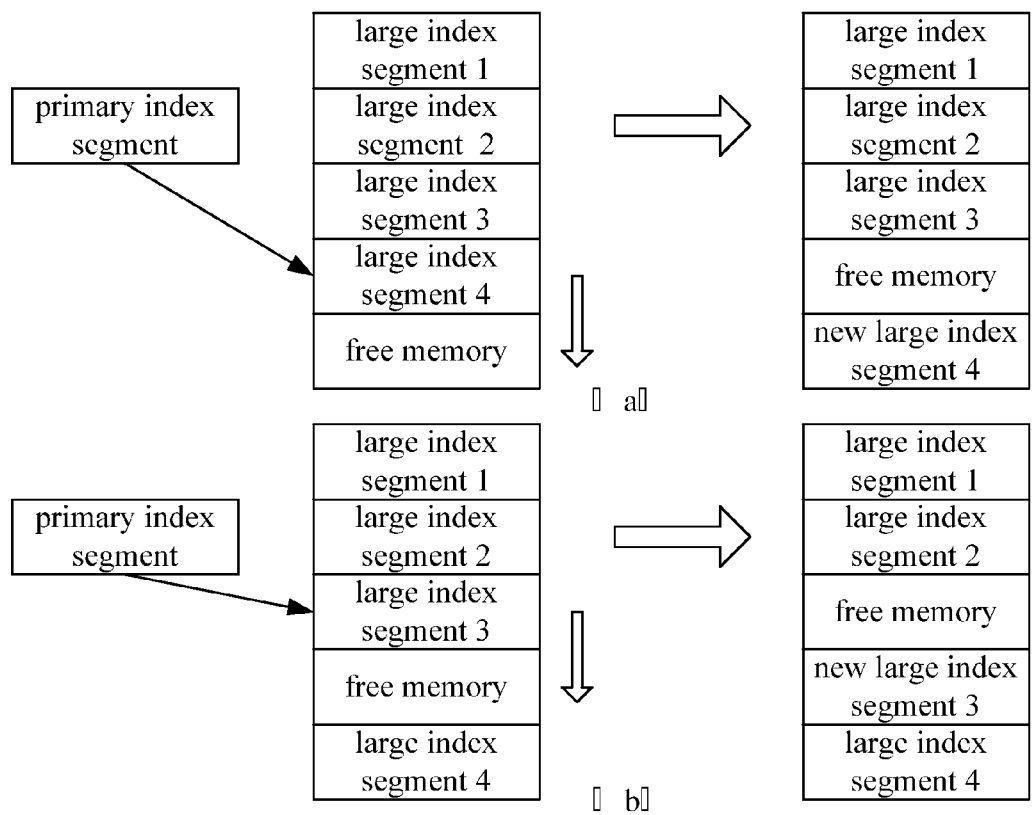
FIG. 4 is a schematic diagram showing a process of constructing index according to the second example of the present disclosure.

In order to facilitate understanding, in this example, the merging manner of this step will be described in details with reference to a merging process shown in FIG. 4. In specific realization, the method provided in this example may allocate in advance a continuous chunk of memory, and the memory stores a plurality of large index segments and a free memory area. Every time selecting a large index segment neighboring the free memory area for merging, one large index segment neighboring and locating above the free memory area may be selected, and one large index segment neighboring and locating below the free memory area may also be selected. If there is no large index segment above and below the free memory area, the primary index segments are directly merged in the free memory. Referring to FIG. 4a, in this example, as an instance, one large index segment, which neighbors the free memory area, locates above the free memory area and is selected from the large index segment set, is the large index segment 4. One primary index segment needed to be merged will be merged into the corresponding large index segment 4. After selecting to merge the primary index segment into the corresponding large index segment 4, one new large index segment 4 is obtained through mergence. In subsequent mergence of primary index segments, referring to FIG. 4(b), according to the last selection manner, one selected large index segment which neighbors the free memory area and locates above the free memory area, is the large index segment 3, the obtained large index segment set after mergence is shown in FIG. 4(b).

Since when merging the primary index segments into the corresponding large index segment, the way of merging the primary index segments into a large index segment which neighbors the free memory is adopted, combined with FIG. 3 and the above discussed contents, it can be seen that the merging manner provided in this example can ensure a continuous free memory, i.e., there is no void in the memory, thereby improving utilization of the memory. Further, in the merging manner provided in this example, there is no intersection between a large index segment and a primary index segment which are needed to be merged; thus, before the completion of the merging, this large index segment and the primary index segment can still continue providing search service.

Preferably, after copying each primary index segment in the primary index segment set and merging the copied primary index segments into a corresponding large index segment, to obtain a large index segment set, the method provided in this example further includes: backing up each large index segment in the large index segment set. With respect to specific backup mode, this example does not place any make specific limits on it. In actual applications, each large index segment in the obtained large index segment set may be backed up to a local disk.

204: sending the primary index segments in the primary index segment set or the large index segments in the large index segment set to a search device to provide search service.

For this step, when constructing an index segment in the method provided in this example, the constructed index segment at least further includes a seqno (sequence number) value and an IsComplete sign of whether being complete in addition to the common inverted index, delete table, document basic information and other information. The seqno value is configured to distinguish constructed different index segments. This example does not limit size of the sequence number value. Taking the seqno value being a 64-bit integer as an example, for each constructed primary index segment, the seqno value of each constructed primary index segment strictly increases progressively starting from 1. This example does not limit rate of increasing progressively. As an instance, the seqno value can be progressively increased by adding 1 every time. Every time a new primary index segment is constructed, a new seqno value is allocated to the new primary index segment. When a large index segment and a primary index segment are merged into a new large index segment, a sequno value of the new large index segment is equal to the larger of a sequno value of the large index segment and a sequno value of the primary index segment. The IsComplete sign refers to whether one index segment is complete. In this example, for one primary index segment, after the primary index segment has been merged into a primary index segment set, this primary index segment is complete, i.e., this primary index segment includes all data within 5 minutes. If the preset time period is not reached, one primary index segment may continue to obtain data subsequently, which means that the currently constructed primary index segment does not include all data within 5 minutes; thus, this primary index segment is not complete. While for each large index segment, since each large index segment is obtained through merging complete primary index segments, thus, each large index segment is complete. Preferably, in order to check index data, one index segment may further include an md5 check value. The md5 check value refers to md5 values of all bytes of the index segment.

In combination with the above information contained in the primary segment, when sending the primary index segments in the primary index segment set or the large index segments in the large index segment set to a search device to provide search service, the method provided in this example specifically includes:

receiving an index segment application sent from the search device, the application carrying a sequence number and a sign of whether being complete;

sending corresponding index segments to the search device according to the sequence number and sign of whether being complete carried in the application, the corresponding index segments being primary index segments of the primary index segment set or large index segments of the large index segment set.

The purpose why the search device sends the index application is to obtain newly constructed index segments so as to update index segments already in the search device itself, thus, the sequence number value carried in the application sent from the search device is the largest sequence number value of those of the index segments already in the search device. For situations in which the search device has no index segment due to reasons such as initial start-up, restart, failure, when the search device sends the index segment application, the sequence number value carried in the application is set to null. The situation in which the sequence number value is null will be described in details when introducing a searching method as shown in step 1001 of the example five.

Further, returning corresponding index segments to the search device according to the sequence number and sign of whether being complete carried in the application specifically includes:

if the sequence number value carried in the application is null, reading and sending backed up index segments to the search device;

or, if the sequence number value carried in the application is non-null and the application carries a sign of being incomplete, returning an index segment with a sequence number value the same as the sequence number value carried in the application to the search device;

or, if the sequence number value carried in the application is non-null and the application carries a sign of being complete, returning an index segment with a sequence number value which is the next sequence number value of the sequence number value carried in the application to the search device.

In the method provided in this example, through constructing a plurality of primary index segments on the basis of time, merging the constructed primary index segments into the large index segment, and providing the search service simultaneously with the primary index segments or the large index segments, the search speed can be improved. When merging index segments, the index segments are preferably merged into an index segment neighboring the free memory area, thereby improving utilization of the memory. Further, when constructing a primary index segment, existing data in the index segment can be used to initialize the index segment so as to construct appropriate and fast memory data structures, thus, the search speed can be further improved.

Third Example

Figure 5:
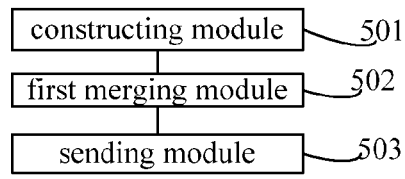
FIG. 5 is a first schematic diagram of an index constructing device according to a third example of the present disclosure.

This example provides an index constructing device, which can be used to perform the index constructing method of the above second example. Referring to FIG. 5, the index constructing device includes:

a constructing module 501 configured to construct data obtained in each preset time period into a primary index segment, respectively; and merge the constructed primary index segment into a primary index segment set after each preset time period is over;

a first merging module 502 configured to copy each primary index segment in the primary index segment set obtained by the constructing module 501 and merge the copied primary index segments into a corresponding large index segment to obtain a large index segment set;

a sending module 503 configured to send the primary index segments in the primary index segment set obtained by the constructing module 501 or the large index segments in the large index segment set obtained by the first merging module 502 to a search device to provide search service.

Specifically, the first merging module 502 is specifically configured to copy, in turn according to time sequence, each primary index segment in the primary index segment set obtained by the constructing module 501, and merge the copied primary index segments into a corresponding large index segment which is a large index segment in the large index segment set and neighbors a free memory.

Figure 6:
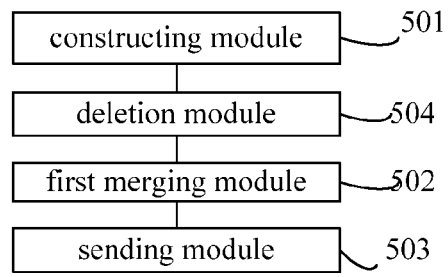
FIG. 6 is a second schematic diagram of the index constructing device according to the third example of the present disclosure.

Preferably, referring to FIG. 6, the device further includes:

a deletion module 504 configured to, after the constructing module 501 merges the constructed primary index segment into the primary index segment set, every each preset period, delete primary index segments which are constructed before the each preset period from the primary index segment set.

Figure 7:
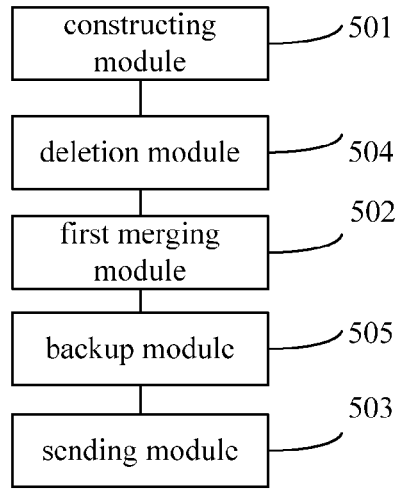
FIG. 7 is a third schematic diagram of the index constructing device according to the third example of the present disclosure.

Preferably, referring to FIG. 7, the device further includes:

a backup module 505 configured to, after the first merging module 502 copies each primary index segment in the primary index segment set obtained by the constructing module 501 and merges the copied primary index segments into a corresponding large index segment to obtain a large index segment set, back up each large index segment in the large index segment set.

Figure 8:
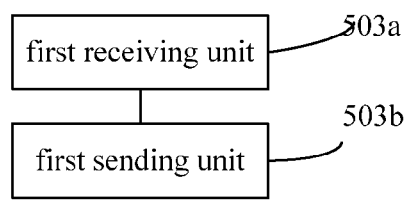
FIG. 8 is a schematic diagram of a sending module according to the third example of the present disclosure.

Each of the primary index segment constructed by the constructing module 501 and the large index segment obtained by the first merging module 502 through merging includes a sequence number value and a sign of whether being complete;

accordingly, when the first merging module 502 copies each primary index segment in the primary index segment set obtained by the constructing module 501 and merges the copied primary index segments into a corresponding large index segment, a sequence number value of the large index segment after merged is the larger of a sequence number value of the primary index segment and a sequence number value of the large index segment when merging;

accordingly, referring to FIG. 8, the sending module 503 specifically includes:

a first receiving unit 503a configured to receive an index segment application sent from the search device, the application carrying a sequence number value and a sign of whether being complete;

a first sending unit 503b configured to, send corresponding index segments to the search device according to the sequence number value and sign of whether being complete carried in the application received by the first receiving unit 503a, the corresponding index segments being primary index segments of the primary index segment set or large index segments of the large index segment set.

Further, the first sending unit 503b is specifically configured to, if the sequence number value carried in the application received by the first receiving unit 503a is null, read and send backed up index segments to the search device; or, if the sequence number value carried in the application received by the first receiving unit 503a is non-null and the application carries a sign of being incomplete, return an index segment with a sequence number value the same as the sequence number value carried in the application to the search device; or, if the sequence number value carried in the application received by the first receiving unit 503a is non-null and the application carries a sign of being complete, return an index segment with a sequence number value which is the next sequence number value of the sequence number value carried in the application to the search device.

In the device provided in this example, through constructing a plurality of primary index segments on the basis of time, merging the constructed primary index segments into the large index segment, and providing the search service simultaneously with the primary index segments or the large index segments, thus, the search speed can be improved. Further, when merging index segments, the index segments are preferably merged into an index segment neighboring the free memory area, thereby improving utilization of the memory.

Example Four

Figure 9:
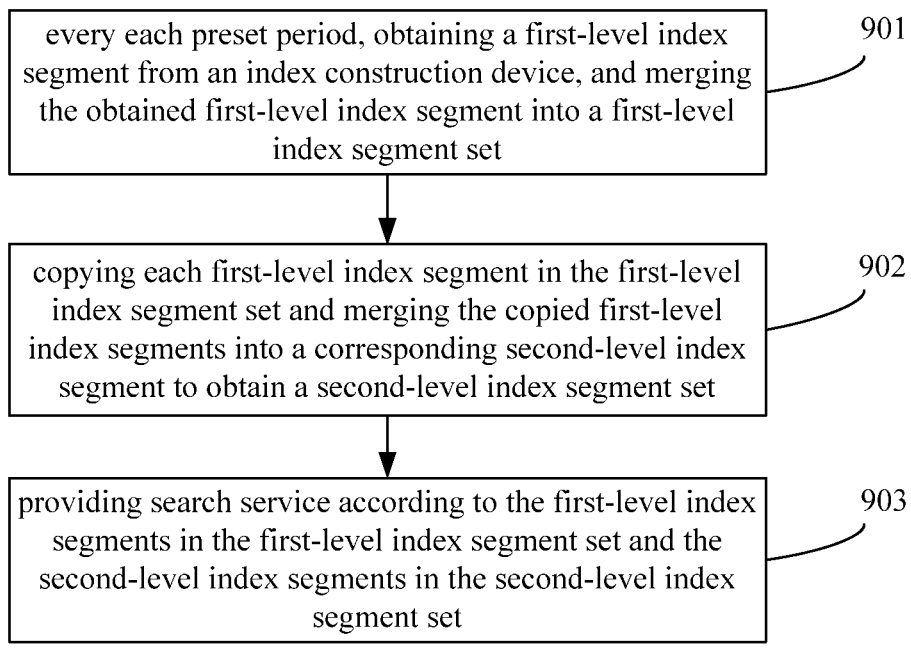
FIG. 9 is a flow chart of a search method according to a forth example of the present disclosure.

This example provides a search method, referring to FIG. 9, a flow chart of the search method provided in this example is specifically as follows:

901: every each preset period, obtaining a first-level index segment from an index constructing device, and merging the obtained first-level index segment into a first-level index segment set;

902: copying each first-level index segment in the first-level index segment set and merging the copied first-level index segments into a corresponding second-level index segment to obtain a second-level index segment set;

903: providing search service according to the first-level index segments in the first-level index segment set and the second-level index segments in the second-level index segment set.

In order to better explain the method provided in this example, the method provided in this example will be described in detail hereinafter with reference to specific contents of example five, referring to the contents of the following example five.

Example Five

Figure 10:
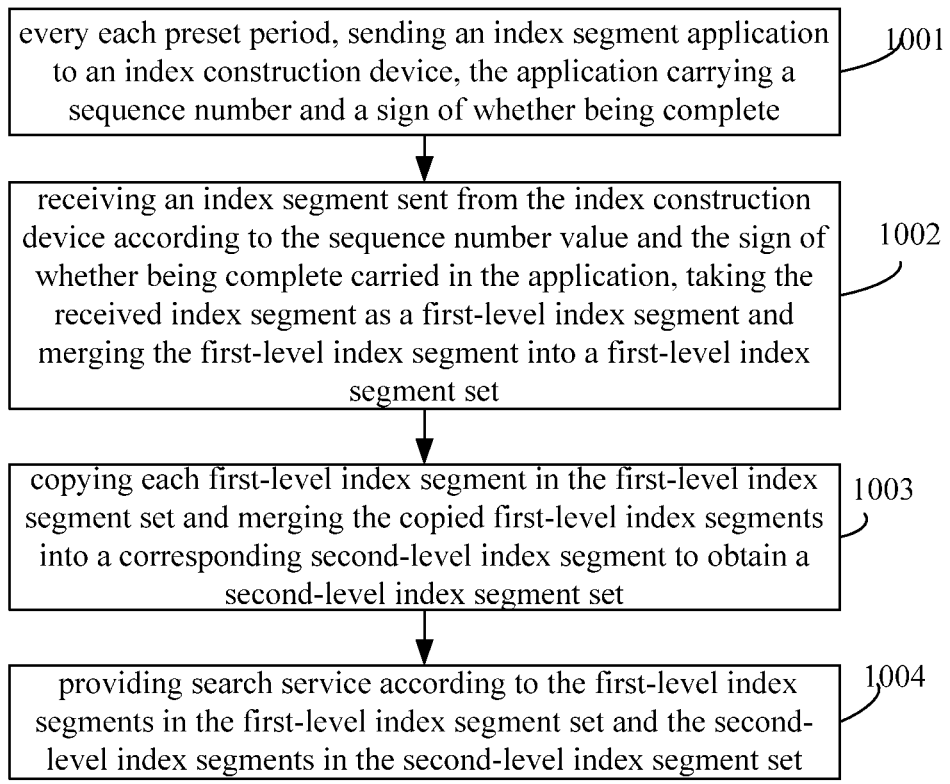
FIG. 10 is a flow chart of a search method according to a fifth example of the present disclosure.

This example provides a search method, referring to FIG. 10, a flow chart of the search method provided in this example is specifically as follows:

1001: every each preset period, sending an index segment application to an index constructing device, the application carrying a sequence number value and a sign of whether being complete.

For this step, in order to update in real time already existed index segments so as to ensure accuracy of search results, it is needed to continue obtaining index segments from the index constructing device, thus, the preset period can be set to be a few seconds or minutes. This example does specifically limit size of the preset period.

Further, in order to be able to obtain the needed index segments from the index constructing device, every each preset period, the search device sends an index segment application to the index constructing device, the application each carries a sequence number value and a sign of whether being complete. In order to obtain new index segments constructed by the index constructing device so as to update index segments used for searching, when sending the index segment application in this step, the sequence number value carried in the application is the largest sequence number value of those of the index segments already existed in the search device.

For situations in which the search device has no index segment due to reasons such as initial start-up, restart, failure, when sending the index segment application in this step, the sequence number value carried in the application is determined to be null. The determining manner can be processed separately according to the following two different situations:

First situation: the search device has no index segment after the search device is restarted due to various reasons (such as initial deployment, crash, and power outage).

For this situation, when the search device sends the index segment application to the index constructing device, the seqno value carried in the application is set to null. After the index constructing device receives the index segment application whose sequence number value is null, the index constructing device returns the most recent backup data read from a disk. As an instance, the index constructing device backs up the large index segments once every one hour and deletes primary index segments in the primary index segment set every two hours; then, the next time applying for index segments, the new index segments are in the primary index segment set.

The second situation: when network environment is out of state (for example, the network cannot be used in continuous 30 minutes), the search device cannot communicate with the index constructing device in a long-term, there is a large difference between index segments used by the search device during searching and index segments constructed by the index constructing device.

For this situation, as an instance, the index constructing device backs up the large index segments once every one hour and deletes primary index segments in the primary index segment set every two hours. When sending the index segment application to the index constructing device in this step, if the sequence number value carried in the application still is the largest sequence number value of those of the index segments already existed in the search device, then, after the search index constructing device receives the sequence number value carried in the application: if the search device finds an index segment corresponding to the sequence number value and determines that a time gap in construction of the index segment corresponding to the sequence number value is within two hours (i.e., off the network within two hours), the normal process is still performed (because the first-level index segment set of the search device contains first-level index segments of two hours); if determining that a time gap in construction of the index segment corresponding to the sequence number value is greater than two hours (i.e., off the network more than two hours), then the index constructing device can issue an error notification to the search device, so as to notify the search device to empty the current index segments and perform according to the processing manner of the first situation. This example does not limit the manner in which the index constructing device sends the notification message to the search device. For this situation, other processing manners may be adopted, and this example does not specifically limit it so long as ensuring that the search device is able to obtain index segments constructed by the index constructing device after the search device sends failure.

It can be seen from the above example two, since each index segment includes a sequence number value and a sign of whether being complete, thus, when the index constructing device receives an application carrying a sequence number value and a sign of whether being complete, the index constructing device can determine to return which index segment. The manner in which the index constructing device returns index segments refers to related description in the step 201 of the above example two, and is not repeated here.

1002: receiving an index segment sent from the index constructing device according to the sequence number value and the sign of whether being complete carried in the application, taking the received index segment as a first-level index segment and merging the first-level index segment into a first-level index segment set.

For this step, in actual implementation, when merging a received first-level index segment into a first-level index segment set, the received first-level index segment can be arranged in the first-level index segment set in order according to the received sequence. If a received first-level index segment is an incomplete index segment, this received first-level index segment is directly arranged as the last index segment in the first-level index segment set. If a received first-level index segment is a complete index segment, this received first-level index segment covers the last index segment in the first-level index segment set. About how to determine whether the received first-level index segment is complete, it can be obtained through the sign of whether being complete included in the first-level index segment.

It should be noted, the above steps 1001 and 1002 are examples for illustrating the step 901 of example four. In actual applications, other manners can be adopted to achieve obtaining a first-level index segment from an index constructing device every each preset period of the step 901. This example does not specifically limit this.

1003: copying each first-level index segment in the first-level index segment set and merging the copied first-level index segments into a corresponding second-level index segment to obtain a second-level index segment set.

Figure 11:
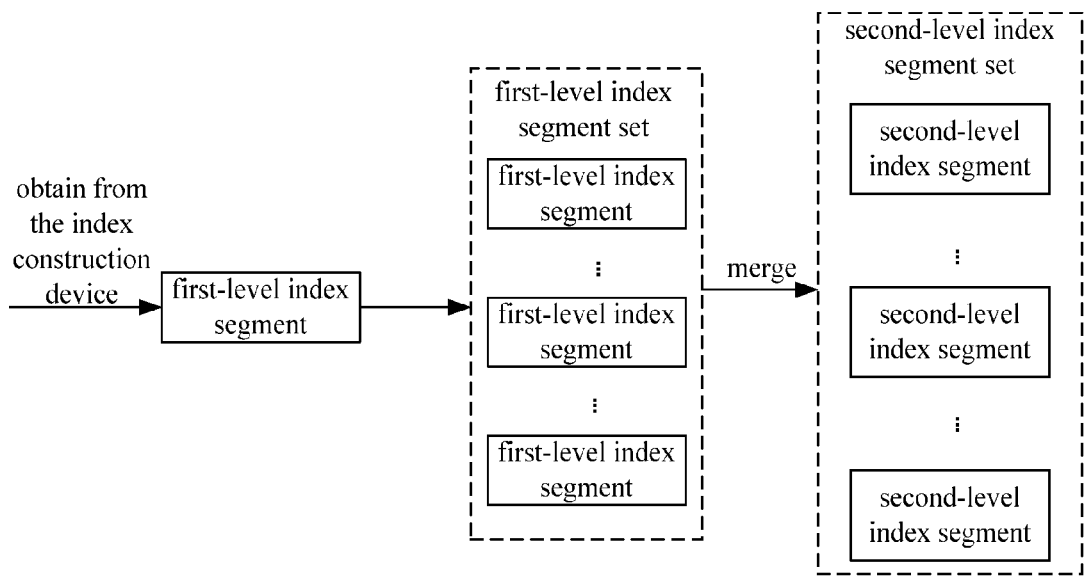
FIG. 11 is a schematic diagram of searching according to the fifth example of the present disclosure.

For this step, one process of merging the first-level index segments and the second-level index segments can be shown in FIG. 11. The merging principle is the same as the principle of merging the primary index segments and the large index segment in the step 203 of example two, i.e., each first-level index segment in the first-level index segment set may be copied in turn according to time sequence and the copied first-level index segments are merged into the corresponding second-level index segment. The corresponding second-level index segment is a second-level index segment which is in the second-level index segment set and neighbors a free memory. A sequence number value of the second-level index segment after merged is the larger sequence number value of a sequence number value of the first-level index segment and a sequence number value of the second-level index segment when merging.

1004: providing search service according to the first-level index segments in the first-level index segment set and the second-level index segments in the second-level index segment set.

For the search method provided in this example, in actual applications, the time of merging a complete primary index segment constructed in one preset time period and a large index segment is less than the preset time period, thus, searching and constructing indexes are fully synchronized. A formula for calculating a total delay of a data from being constructed into an index to being able to be searched is as:

$$T = T_{insert\_to\_segment} + T_{copy\_segment} + T_{reload\_segment}$$

Where, $T_{insert\_to\_segment}$ refers to time of constructing the data into the index segment, i.e., time of constructing the data into a primary index segment in this example of the present disclosure, equivalent to a time-consuming of constructing one data into an index segment plus a time-consuming of merging the index segment into the primary index segment; in a system of ten millions of standalones, the time-consuming is at a level of seconds. $T_{copy\_segment}$ refers to a time-consuming of copying one primary index segment; in a system of ten millions of standalones and 1000M local area network, the time-consuming is at a level of seconds. $T_{reload\_segment}$ refers to a time-consuming of initializing a primary index segment, which can be almost 0s according to results of practical statistics. Thus, according to the above analysis, the total delay of the search method provided in this example is at a level of seconds; it can be seen, the search speed of the search method provided in this example is quite fast, and there is significant improvement compared with the related art.

In the method provided in this example, through obtaining index segments from the index constructing device and receiving primary index segments or the large index segments returned and constructed by the index constructing device, the search service can be provided and search speed can be improved. When merging the first-level index segments into the corresponding second-level index segment, the first-level index segments are preferably merged into a second-level index segment neighboring the free memory area, thereby improving utilization of the memory. Further, the search method provided in this example also adopts a fault-tolerant mechanism for abnormal situations encountered in the searching processing, thereby ensuring real-time performance of searching.

Example Six

Figure 12:
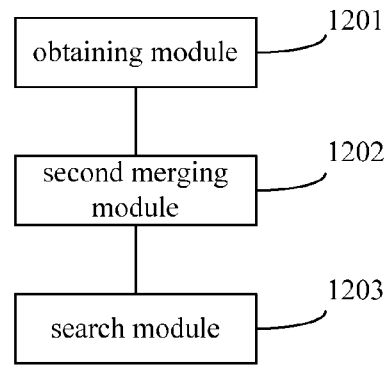
FIG. 12 is a schematic diagram of a search device according to a sixth example of the present disclosure.

This example provides a search device, referring to FIG. 12, the device includes:

an obtaining module 1201 configured to, every each preset period, obtain a first-level index segment from an index constructing device, and merge the obtained first-level index segment into a first-level index segment set;

a second merging module 1202 configured to copy each first-level index segment in the first-level index segment set obtained by the obtaining module 1201, and merge the copied first-level index segments into a corresponding second-level index segment to obtain a second-level index segment set;

a search module 1203 configured to provide search service according to the first-level index segments in the first-level index segment set obtained by the obtaining module 1201 and the second-level index segments in the second-level index segment set obtained by the second merging module 1202.

Specifically, the second merging module 1202 is specifically configured to copy each first-level index segment in the first-level index segment set in turn according to time sequence, and merge the copied first-level index segments into the corresponding second-level index segment. The corresponding second-level index segment is a second-level index segment which is in the second-level index segment set and neighbors a free memory.

Figure 13:
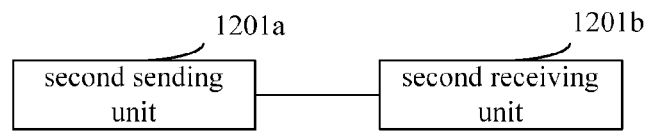
FIG. 13 is a schematic diagram of an obtaining module according to the sixth example of the present disclosure.

Each of the first-level index segment obtained by the obtaining module 1201 and the second-level index segment obtained by the second merging module 1202 includes a sequence number value and a sign of whether being complete;

Accordingly, referring to FIG. 13, the obtaining module 1201 specifically includes:

a second sending unit 1201a configured to, every each preset period, send an index segment application to the index constructing device, the application carrying a sequence number value and a sign of whether being complete;

a second receiving unit 1201b configured to receive the index segment sent by the index constructing device according to the sequence number value and sign of whether being complete sent by the second sending unit 1201a, and take the received index segment as a first-level index segment and merge the first-level index segment into a corresponding second-level index segment;

Accordingly, when the second merging module 1202 copies each first-level index segment in the first-level index segment set obtained by the obtaining module 1201, and merges the copied first-level index segments into the corresponding second-level index segment, a sequence number value of the second-level index segment after merged is the larger sequence number value of a sequence number value of the first-level index segment and a sequence number value of the second-level index segment when merging.

In the device provided in this example, through obtaining index segments from the index constructing device and receiving primary index segments or the large index segments returned and constructed by the index constructing device, the search service can be provided and search speed can be improved. When merging the first-level index segments into the corresponding second-level index segment, the first-level index segments are preferably merged into a second-level index segment neighboring the free memory area, thereby improving utilization of the memory. Further, the device provided in this example also adopts a fault-tolerant mechanism for abnormal situations encountered in the searching processing, thereby ensuring real-time performance of searching.

Example Seven

Figure 14:
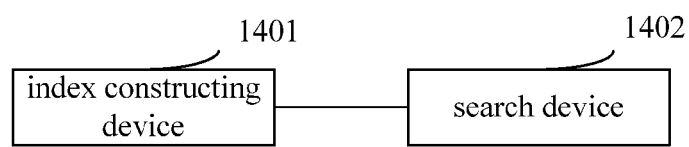
FIG. 14 is a schematic diagram of a search system according to a seventh example of the present disclosure.

This example provides a search system, referring to FIG. 14, the system includes an index constructing device 1401 and a search device 1402.

The index constructing device 1401 can be the index constructing device provided in the above example three.

The search device 1402 can be the search device provided in the above example six.

Figure 15:
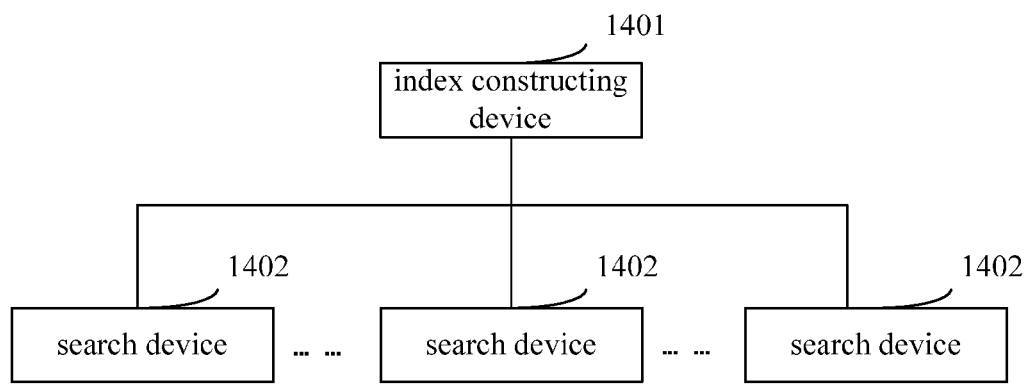
FIG. 15 is a schematic diagram of another search system module according to the seventh example of the present disclosure.

In actual applications, the search system includes the index constructing device 1401 and the search device 1402; the index constructing device 1401 constructs the obtained data into an index segment and sends the constructed index segment to the search device 1402, or the search device 1402 actively obtains index segments from the index constructing device 1401 and process the index segments, so as to provide search service for users. Generally, one index constructing device 1401 can provide service for a plurality of search devices 1402. In large-scale search applications, data can be cut into multiple parts, and each part of data corresponding to one index constructing device 1401 and a plurality of the search devices 1402. This example and each of the above examples are illustrated for only one part of data; with respect to support large-scale search applications, it is only needed to copy multiple copies of the system provided in this example with each copy storing different data and merge these data again when searching. The index constructing device 1401 can be in a separate device and each device for searching only contains one search device 1402, information can be transmitted between the device containing index constructing device 1401 and the device containing search device 1402 through local area network. Thus, in the search system provided in this example, there can be one or more the search devices 1402, then the structure of the search system can also be as shown in FIG. 15.

The system provided in this example uses the index constructing device to construct a plurality of primary index segments on the basis of time, merge the constructed primary index segments into the large index segment and send the primary index segments or the large index segments to the search device so as to provide search service, thus, search speed can be improved. When the index constructing device merges the index segments, the index segments are preferably merged into an index segment neighboring the free memory area, thereby improving utilization of the memory.

It should be noted, when the index constructing device provided in the above example constructs indexes and when the search device provided in the above example performs searching, the above division of functional modules is only taken as an example for illustration; in actual applications, the above functions can be allocated to be completed by different functional modules according to needs, i.e., dividing the internal structure of the device into different functional modules so as to complete all or part of the above-described functions. Further, the index constructing device provided in the above example and the example of the index constructing method belong to the same concept, and the search device provided in the above example and the example of the search method belong to the same concept, the specific implementation processes refer to the examples of methods and are not repeated here.

The above serial numbers of the examples of the present disclosure are just used for description, rather than indicating the priorities thereof.

All or parts of steps of the examples of the present disclosure may be implemented by hardware, or may be completed by using a program to instruct relevant hardware. The program may be stored in readable storage medium, such as CD-ROM or hard disk, etc.

The foregoing are only preferred examples of the present disclosure, and are not used to limit the present disclosure. Any modification, equivalent replacement, or improvement made without departing from the spirit and principle of the present disclosure should fall within the scope of the present disclosure.

What is claimed is:

1. An index constructing method comprising:
   constructing data obtained in each preset time period into a primary index segment, respectively, and merging the constructed primary index segment into a primary index segment set after each preset time period is over;
   copying each primary index segment in the primary index segment set and merging the copied primary index segments into a corresponding large index segment, to obtain a large index segment set; and
   sending the primary index segments in the primary index segment set or the large index segments in the large index segment set to a search device to provide search service;
   wherein the copying each primary index segment in the primary index segment set and merging the copied primary index segments into a corresponding large index segment specifically includes
   copying each primary index segment in the primary index segment set in turn according to time sequence, and merging the copied primary index segments into the corresponding large index segment; wherein the corresponding large index segment is a large index segment which is in the large index segment set and neighbors a free memory.

2. The method of claim 1, wherein after merging the constructed primary index segments into a corresponding large index segment, the method further includes:
   every each preset period, deleting primary index segments which are constructed before the each preset period from the primary index segment set.

3. The method of claim 1, wherein after the copying each primary index segment in the primary index segment set and merging the copied primary index segments into a corresponding large index segment, to obtain a large index segment set, the method further includes:

backing up each large index segment in the large index segment set.

4. The method of claim 3, wherein each of the primary index segment and the large index segment includes a sequence number value and a sign of whether being complete;

when copying each primary index segment in the primary index segment set and merging the copied primary index segments into a corresponding large index segment, a sequence number value of the large index segment after merged is the larger sequence number value of a sequence number value of the primary index segment and a sequence number value of the large index segment when merging;

the sending the primary index segments in the primary index segment set or the large index segments in the large index segment set to a search device to provide search service specifically includes:

receiving an index segment application sent from the search device, the application carrying a sequence number value and a sign of whether being complete;

sending corresponding index segments to the search device according to the sequence number value and sign of whether being complete carried in the application, the corresponding index segments being primary index segments of the primary index segment set or large index segments of the large index segment set.

5. The method of claim 4, wherein the returning corresponding index segments to the search device according to the sequence number value and sign of whether being complete carried in the application, specifically includes:

if the sequence number value carried in the application is null, reading backed up index segments and sending the backed up index segments to the search device;

if the sequence number value carried in the application is non-null and the application carries a sign of being incomplete, returning an index segment with a sequence number value the same as the sequence number value carried in the application to the search device;

if the sequence number value carried in the application is non-null and the application carries a sign of being complete, returning an index segment with a sequence number value which is the next sequence number value of the sequence number value carried in the application to the search device.

6. An index constructing device comprising:

a processor and a non-transitory storage medium storing machine readable instructions that are executable by the processor to:

construct data obtained in each preset time period into a primary index segment, respectively, and merge the constructed primary index segment into a primary index segment set after each preset time period is over;

copy each primary index segment in the primary index segment set obtained and merge the copied primary index segments into a corresponding large index segment to obtain a large index segment set; and send the primary index segments in the primary index segment set obtained by the constructing module or the large index segments in the large index segment set obtained to a search device to provide search service;

wherein when the processor performs the process of copying each primary index segment in the primary index segment set obtained and merge the copied primary index segments into a corresponding large index segment to obtain a large index segment set, the machine readable instructions are executable by the processor to copy, in turn according to time sequence, each primary index segment in the primary index segment set obtained by the constructing module through merging, and merge the copied primary index segments into a corresponding large index segment which is a large index segment in the large index segment set and neighbors a free memory.

7. The device of claim 6, wherein the machine readable instructions are further executable by the processor to:

the constructed primary index segment is merged into the primary index segment set, every each preset period, delete primary index segments, which are constructed before the each preset period, from the primary index segment set.

8. The device of claim 6, wherein the machine readable instructions are further executable by the processor to:

each primary index segment in the primary index segment set obtained is copied and the copied primary index segments is merged into a corresponding large index segment to obtain a large index segment set, back up each large index segment in the large index segment set.

9. The device of claim 8, wherein each of the primary index segment constructed and the large index segment obtained through merging includes a sequence number value and a sign of whether being complete;

when each primary index segment in the primary index segment set obtained is copied and the copied primary index segments is merged into a corresponding large index segment, a sequence number value of the large index segment after merged is the larger of a sequence number value of the primary index segment and a sequence number value of the large index segment when merging;

when the processor performs the process of sending the primary index segments in the primary index segment set obtained or the large index segments in the large index segment set obtained to a search device, the machine readable instructions are executable by the processor to receive an index segment application sent from the search device, the application carrying a sequence number value and a sign of whether being complete, and send corresponding index segments to the search device according to the sequence number value and sign of whether being complete carried in the application received, the corresponding index segments being primary index segments of the primary index segment set or large index segments of the large index segment set.

10. The device of claim 9, wherein, when the processor performs the process of sending corresponding index segments to the search device according to the sequence number value and sign of whether being complete carried in the application received, the machine readable instructions are executable by the processor to: if the sequence number value carried in the application received is null, read backed up index segments and send the backed up index segments to the search device; if the sequence number value carried in the application received is non-null and the application carries a sign of being incomplete, return an index segment with a sequence number value the same as the sequence number value carried in the application to the search device; if the sequence number value carried in the application received by the first receiving unit is non-null and the application carries a sign of being complete, return an index segment with a sequence number value which is the next sequence number value of the sequence number value carried in the application to the search device.

11. A search method comprising:
every each preset period, obtaining a first-level index segment from an index constructing device, and merging the obtained first-level index segment into a first-level index segment set;
copying each first-level index segment in the first-level index segment set and merging the copied first-level index segments into a corresponding second-level index segment to obtain a second-level index segment set;
providing search service according to the first-level index segments in the first-level index segment set and the second-level index segments in the second-level index segment set;
wherein each of the first-level index segment and the second-level index segment includes a sequence number value and a sign of whether being complete;
every each preset period, obtaining a first-level index segment from an index constructing device, specifically includes
every each preset period, sending an index segment application to the index constructing device, the application carrying a sequence number value and a sign of whether being complete; the sequence number value being the largest sequence number value of those of already existed index segments or null;
receiving the index segment sent by the index constructing device according to the sequence number value and sign of whether being complete, and taking the received index segment as a first-level index segment;
when copying each first-level index segment in the first-level index segment set and merging the copied first-level index segments into a corresponding second-level index segment, a sequence number value of the second-level index segment after merged is the larger sequence number value of a sequence number value of the first-level index segment and a sequence number value of the second-level index segment when merging.

12. The method of claim 11, wherein the copying each first-level index segment in the first-level index segment set and merging the copied first-level index segments into a corresponding second-level index segment, specifically includes:
copying each first-level index segment in the first-level index segment set in turn according to time sequence and merging the copied first-level index segments into a corresponding second-level index segment; wherein the corresponding second-level index segment is a second-level index segment which is in the second-level index segment set and neighbors a free memory.

13. A search device comprising:
a processor and a non-transitory storage medium storing machine readable instructions that are executable by the processor to:

every each preset period, obtain a first-level index segment from an index constructing device, and merge the obtained first-level index segment into a first-level index segment set;
copy each first-level index segment in the first-level index segment set obtained by the obtaining module, and merge the copied first-level index segments into a corresponding second-level index segment to obtain a second-level index segment set;
provide search service according to the first-level index segments in the first-level index segment set obtained by the obtaining module and the second-level index segments in the second-level index segment set obtained by the second merging module;
wherein when the processor performs the process of copying each first-level index segment in the first-level index segment set obtained by the obtaining module, and merge the copied first-level index segments into a corresponding second-level index segment to obtain a second-level index segment set, wherein the machine readable instructions are further executable by the processor to
copy each first-level index segment in the first-level index segment set in turn according to time sequence, and merge the copied first-level index segments into a corresponding second-level index segment; the corresponding second-level index segment is a second-level index segment which is in the second-level index segment set and neighbors a free memory.

14. The device of claim 13, wherein each of the first-level index segment obtained by the obtaining module and the second-level index segment obtained a sequence number value and a sign of whether being complete;
when the processor performs the process of every each preset period, obtaining a first-level index segment from an index constructing device, and merging the obtained first-level index segment into a first-level index segment set, the machine readable instructions are executable by the processor to:
every each preset period, send an index segment application to the index constructing device, the application carrying a sequence number value and a sign of whether being complete;
receive the index segment sent by the index constructing device according to the sequence number value and sign of whether being complete sent by the second sending unit, and take the received index segment as a first-level index segment and merge the first-level index segment into a corresponding second-level index segment;
when each first-level index segment in the first-level index segment set obtained is copied and the copied first-level index segments is merged,
into the corresponding second-level index segment, a sequence number value of the second-level index segment after merged is the larger sequence number value of a sequence number value of the first-level index segment and a sequence number value of the second-level index segment when merging.

* * * * *